United States Patent
Bahl et al.

(10) Patent No.: US 6,377,921 B1
(45) Date of Patent: Apr. 23, 2002

(54) IDENTIFYING MISMATCHES BETWEEN ASSUMED AND ACTUAL PRONUNCIATIONS OF WORDS

(75) Inventors: Lalit R. Bahl, Port Jefferson; Mukund Padmanabhan, Ossining, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/105,763

(22) Filed: Jun. 26, 1998

(51) Int. Cl.[7] .............................................. G10L 15/06
(52) U.S. Cl. ....................... 704/243; 704/256; 704/242
(58) Field of Search ............................... 704/240–245, 704/250, 233, 255–257

(56) References Cited

U.S. PATENT DOCUMENTS

| | | | |
|---|---|---|---|
| 4,803,729 A | * | 2/1989 | Baker .......................... 704/241 |
| 5,050,215 A | * | 9/1991 | Nishimura ................... 704/244 |
| 5,127,055 A | * | 6/1992 | Larkey ........................ 704/243 |
| 5,685,924 A | * | 11/1997 | Stanley et al. .............. 704/233 |
| 5,839,105 A | * | 11/1998 | Ostendorf et al. .......... 704/256 |
| 6,026,359 A | * | 2/2000 | Yamaguchi et al. ........ 704/256 |
| 6,067,517 A | * | 5/2000 | Bahl et al. ................... 704/256 |

* cited by examiner

Primary Examiner—David D. Knepper
(74) Attorney, Agent, or Firm—F. Chau & Associates, LLP

(57) ABSTRACT

A method of identifying mismatches between acoustic data and a corresponding transcription, the transcription being expressed in terms of basic units, comprises the steps of: aligning the acoustic data with the corresponding transcription; computing a probability score for each instance of a basic unit in the acoustic data with respect to the transcription; generating a distribution for each basic unit; tagging, as mismatches, instances of a basic unit corresponding to a particular range of scores in the distribution for each basic unit based on a threshold value; and correcting the mismatches.

19 Claims, 3 Drawing Sheets

IDENTIFYING MISMATCHES BETWEEN ASSUMED AND ACTUAL PRONUNCIATIONS OF WORDS

BACKGROUND OF THE INVENTION

This invention relates to speech recognition and, more particularly, to apparatus and methods for identifying mismatches between assumed pronunciations of words, e.g., from transcriptions, and actual pronunciations of words, e.g., from acoustic data.

Speech recognition systems are being used in several areas today to transcribe speech into text. The success of this technology in simplifying man-machine interaction is stimulating the use of the technology in several applications such as transcribing dictation, voicemail, home banking, directory assistance, etc. Though it is possible to design a generic speech recognition system and then use it in a variety of different applications, it is generally the case that if the system is tailored to the particular application being addressed, it is possible to obtain much better performance than the generic system.

Most speech recognition systems consist of two components: an acoustic model that models the characteristics of speech, and a language model that models the characteristics of the particular spoken language. The parameters of both these models are generally estimated from training data from the application domain of interest.

In order to train the acoustic models, it is necessary to have acoustic data along with the corresponding transcription. For training the language model, it is necessary to have the transcriptions that represent typical sentences in the selected application domain.

Hence, with the goal of optimizing the performance in the selected application domain, it is often the case that much training data is collected from the domain. However, it is also often the case that only the acoustic data can be collected in this manner, and the data has to be transcribed later, possibly by a human listener. Further, it is the case that where spontaneous speech is concerned, it is relatively difficult to obtain verbatim transcriptions because of the existence of several mispronunciations, inconsistencies and errors in the speech, and the human transcription error rate is fairly high. This in turn has an implication on the estimation of the acoustic model parameters and, as is known, transcriptions with a significant amount of errors often lead to poorly estimated or corrupted acoustic models.

Accordingly, it would be highly advantageous to provide apparatus and methods to identify regions of the transcriptions that have errors. Then, it would be possible to post-process these regions, either automatically or by a human or a combination thereof, in order to refine or correct the transcriptions in this region alone.

Further, in most speech recognition systems, it is generally the case that words in the vocabulary are represented as a sequence of fundamental acoustic units such as phones (referred to as the baseform of the word). Also, it is often the case that the baseform representation of a word does not correspond to the manner in which the word is actually uttered. Accordingly, it would also be highly advantageous to provide apparatus and methods to identify such mismatches in the baseform representation and actual acoustic pronunciation of words.

Further, it is often the case that in spontaneous speech, due to co-articulation effects, the concatenation of the baseform representation of a group of words may not be an appropriate model, and it may be necessary to construct a specific baseform for the co-articulated word. For example, the phrase "going to" may commonly be pronounced "gonna." Accordingly, it would also be highly advantageous to provide apparatus and methods for such a co-articulated word to be detected and allow for a specific baseform to be made for it (e.g., a baseform for "gonna") rather than merely concatenating the baseforms of the non-co-articulated phrase (e.g., concatenating baseforms of words "going" and "to").

Lastly, there may also be inconsistencies between a transcription and input acoustic data due to modeling inaccuracies in the speech recognizer. Accordingly, it would be highly advantageous to provide apparatus and methods for erroneous segments in the transcription to be identified, so that they can be corrected by other means.

SUMMARY OF THE INVENTION

The present invention provides apparatus and methods to identify mismatches between some given acoustic data and its supposedly verbatim transcription. It is to be appreciated that the transcription may be, for example, at the word level or phone level and the mismatches may arise due to, for example, inaccuracies in the word level transcription, poor baseform representation of words, background noise at the time the acoustic data was provided, or co-articulation effects in common phrases. The present invention includes starting with a transcription having errors and computing a Viterbi alignment of the acoustic data against the transcription. The words in the transcription are assumed to be expressed in terms of certain basic units or classes such as phones, syllables, words or phrases and the acoustic model is essentially composed of models for each of these different units. The process of Viterbi aligning the data against the transcription and computing probability scores serves to assign a certain probability to each instance of a unit class in the training data. Subsequently, for each class, a histogram of the scores of that class is computed from all instances of that class in the training data. Accordingly, the present invention advantageously identifies those instances of the class that correspond to the lowest scores in the histogram as "problem regions" where there is a mismatch between the acoustic data and the corresponding transcription. Subsequently, the transcription or baseform can be refined for these regions, either automatically or manually by a human listener, as will be explained. It is to be appreciated that the invention is applicable to identification of mismatches between a transcription and acoustic data associated with a training session or a real-time decoding session.

In one aspect of the invention, a method for identifying mismatches between acoustic data and a corresponding transcription, the transcription being expressed in terms of basic units, comprises the steps of: aligning the acoustic data with the corresponding transcription; computing a probability score for each instance of a basic unit in the acoustic data with respect to the transcription; generating a distribution for each basic unit; tagging, as mismatches, instances of a basic unit corresponding to a particular range of scores in the distribution for each basic unit based on a threshold value; and correcting the mismatches.

In another aspect of the invention, computer-based apparatus for identifying mismatches between acoustic data and a corresponding transcription associated with a speech recognition engine, the transcription being expressed in terms of phonetic units, comprises: a processor, operatively coupled to the speech recognition engine, for: aligning the acoustic data with the corresponding transcription; computing a probability score for each instance of a basic unit in the acoustic data with respect to the transcription; generating a distribution for each basic unit; tagging, as mismatches, instances of a basic unit corresponding to a particular range of scores in the distribution for each basic unit based on a threshold value; and correcting the mismatches.

These and other objects, features and advantages of the present invention will become apparent from the following detailed description of illustrative embodiments thereof, which is to be read in connection with the accompanying drawings in which the same reference numerals are used throughout the various figures to designate same or similar components.

DETAILED DESCRIPTION OF PREFERRED EMBODIMENTS

Figure 1:
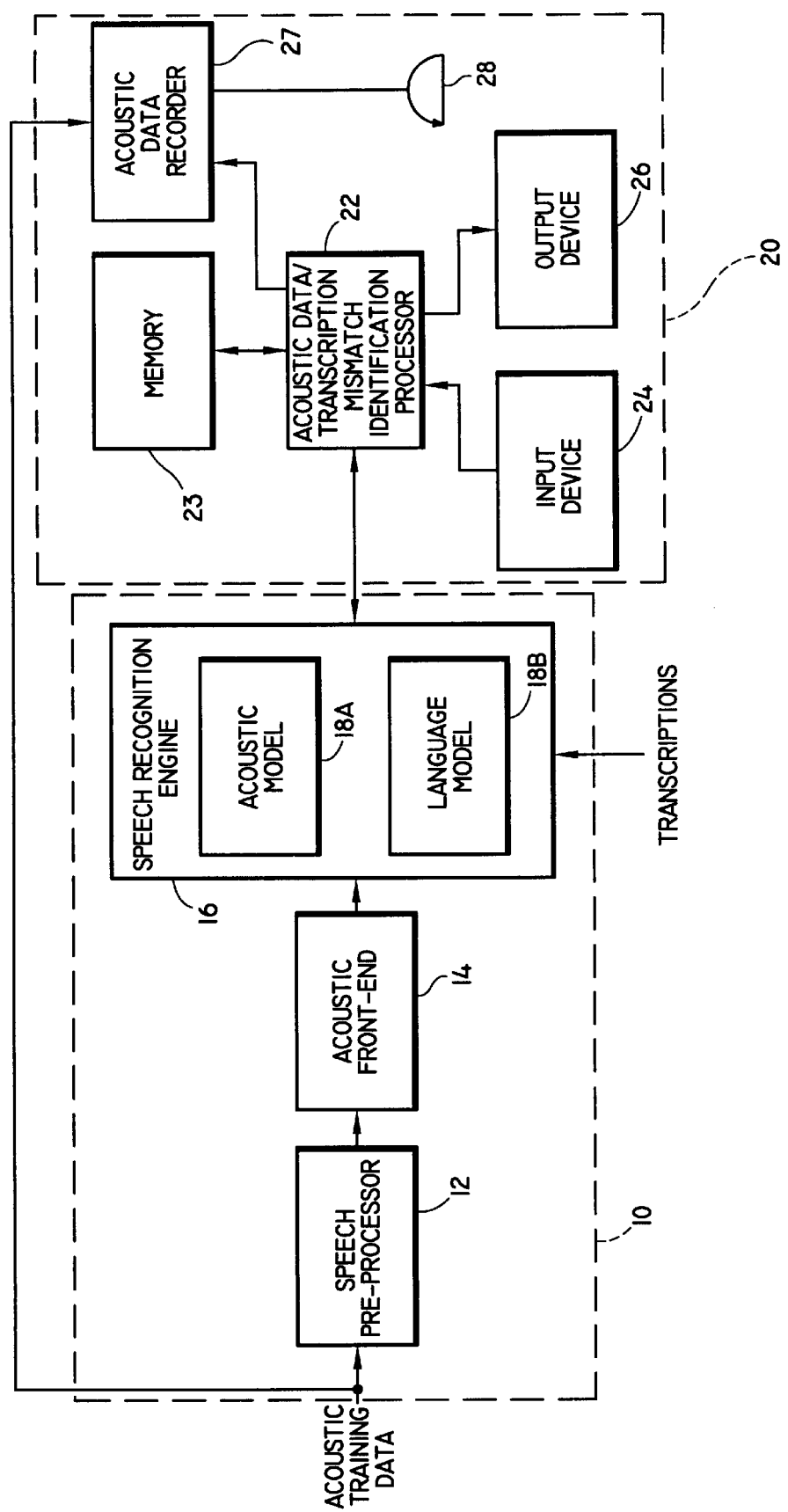
FIG. 1 is a block diagram illustrating a speech recognition system in conjunction with one embodiment of an acoustic data/transcription mismatch identification facility according to the invention.

Referring initially to FIG. 1, a block diagram is shown of: a speech recognition system 10 operatively coupled to a mismatch identification facility (i.e., system) 20 according to the present invention. The speech recognition system 10, itself, includes a speech utterance pre-processor 12, an acoustic front-end 14 operatively coupled to the pre-processor 12, and a speech recognition engine 16 operatively coupled to the acoustic front-end 14. The engine 16 includes an acoustic model 18A and a language model 18B. It is to be appreciated that the present invention is usable with any speech recognition system and is not, in any way, limited to use with or dependent on any details or methodologies of any particular speech recognition arrangement. For instance, even generalized speech recognition systems such as the commercially available large vocabulary IBM ViaVoice or ViaVoice Gold systems may be adapted to permit and/or perform mismatch identification functions in accordance with the invention. In any case, it should be understood that the elements illustrated in FIG. 1 may be implemented in various forms of hardware, software, or combinations thereof. As such, the main recognition elements (e.g., speech recognition engine) and the mismatch identification processor are implemented in software on one or more appropriately programmed general purpose digital computers. Each general purpose digital computer may contain, for example, a central processing unit (CPU) operatively coupled to associated system memory, such as RAM, ROM and a mass storage device, via a computer interface bus. Accordingly, the software modules performing the functions described herein may be stored in ROM or mass storage and then loaded into RAM and executed by the CPU. As a result, FIG. 1 may be considered to include a suitable and preferred processor architecture for practicing the invention which may be achieved by programming the one or more general purpose processors. Of course, special purpose processors may be employed to implement the invention. The speech recognition engine 16 and mismatch identification processor 22 are, therefore, functional blocks illustrating the computer facility or facilities executing their respective functions. Memory 23 and input and output devices 24 and 26 are preferably part of the computer facility implementing the functions of the processor 22. Also, the speech pre-processor 12 and/or the acoustic front-end 14 may be implemented via one or more digital signal processors operatively coupled to such computer facilities (e.g., via the computer interface bus), as is known in the art. Given the teachings of the invention provided herein, one of ordinary skill in the related art will be able to contemplate these and similar implementations of the elements of the invention.

A brief explanation of the functionality of the components of the speech recognition system 10 will now-be given. The speech utterance pre-processor 12 receives the speech uttered by a speaker and generates representative speech waveforms. The speech utterance pre-processor 12 may include an audio-to-analog transducer (microphone) and an analog-to-digital converter which respectively transduce the utterances into an electrical signal and then convert the electrical signal into a digital signal representative of the speech uttered. Further, the pre-processor may preferably sample the speech signal and partition the signal into overlapping frames so that each frame is discretely processed by the remainder of the system. The output signal of the pre-processor 12 is the sampled speech waveforms which are provided to an acoustic front-end 14. Alternatively, the acoustic front-end 14 may incorporate the functions of the pre-processor 12.

The acoustic front-end 14 receives the speech waveforms and, as is known in the art, generates feature vectors (signals) therefrom. Physiologically related mel cepstra, delta and delta-delta feature vectors are preferred for efficiency and effectiveness of recognition, although other known feature vectors may be used.

As is known, before the speech recognition engine 16 performs the process of real-time decoding using the feature vector signals provided by the acoustic front-end 14, the acoustic model 18A and language model 18B need to be trained. As mentioned, in order to train the acoustic model, acoustic training data is provided by a proposed user of the system, as well as a transcription representative of the training data. The acoustic training data is uttered by the training speaker and processed through the speech pre-processor 12 and acoustic front-end 14, as explained above. The transcription may be input directly to the engine 16 as text. Further, as mentioned, in order to train the language model, a transcription representative of typical sentences in the selected application domain is also provided to the engine 16.

However, due to such factors as, for example, inaccuracies in the transcription, poor baseform representation of words, a noisy speech input background, and/or co-articulation effects in common phrases, conventional systems suffer from poorly estimated or corrupted acoustic models. However, as will be explained, the acoustic data/transcription mismatch identification facility 20 of the invention serves to correct such detrimental factors and thus prevent problems associated with poorly estimated or corrupted acoustic models.

It is to be understood that while a preferred method of the invention is explained in the context of identification of mismatches between a transcription and acoustic training data, the invention is also applicable to identification of mismatches between a transcription and real-time acoustic data as would be realized at the output of the speech recognizer. That is, not only does the invention provide facilities for identifying and correcting such mismatches during training of the speech recognizer, but also for identifying and correcting such mismatches during actual real-time usage of the speech recognizer.

Still referring to FIG. 1, the mismatch identification facility 20 according to the present invention includes a mismatch identification processor 22, operatively coupled to the speech recognition engine 16, memory 23 operatively coupled to the processor 22, and an input device 24 and an output device 26, both operatively coupled to the processor 22. Also, an acoustic data recorder 27 and speaker device 28 are operatively coupled to the input of the speech pre-processor 12 and to the processor 22. The recorder 27 records the input speech utterances for playback to the user, via the speaker device 28, during the process of correcting identified mismatches.

As previously mentioned, it is to be understood that the operations performed in accordance with the mismatch identification processor 22, to be described below, are preferably accomplished via one or more software modules executed on one or more appropriately programmed general purpose digital computers, for example, as described above. The output device 26 may be a visual display (e.g., CRT) which allows the user to review the results of any identified mismatches between the acoustic training data and the transcription, in conjunction with the speaker device 27. The input device 24 may be a standard keyboard or other conventional means (e.g., mouse) for permitting the user to, inter alia, correct any of the identified mismatches. However, it is to be understood that certain corrective steps may be alternatively performed by the processor 22 without human assistance, as will be explained. Nonetheless, the input and output devices are preferably part of the computer system performing the functions of the identification processor 22. Also, memory 23 is preferably part of the same computer system and is used in cooperation with the functional software modules executed by processor 22. Still further, the acoustic data recorder 27 and speaker device 28 may preferably be part of the same computer system.

Figure 2A:
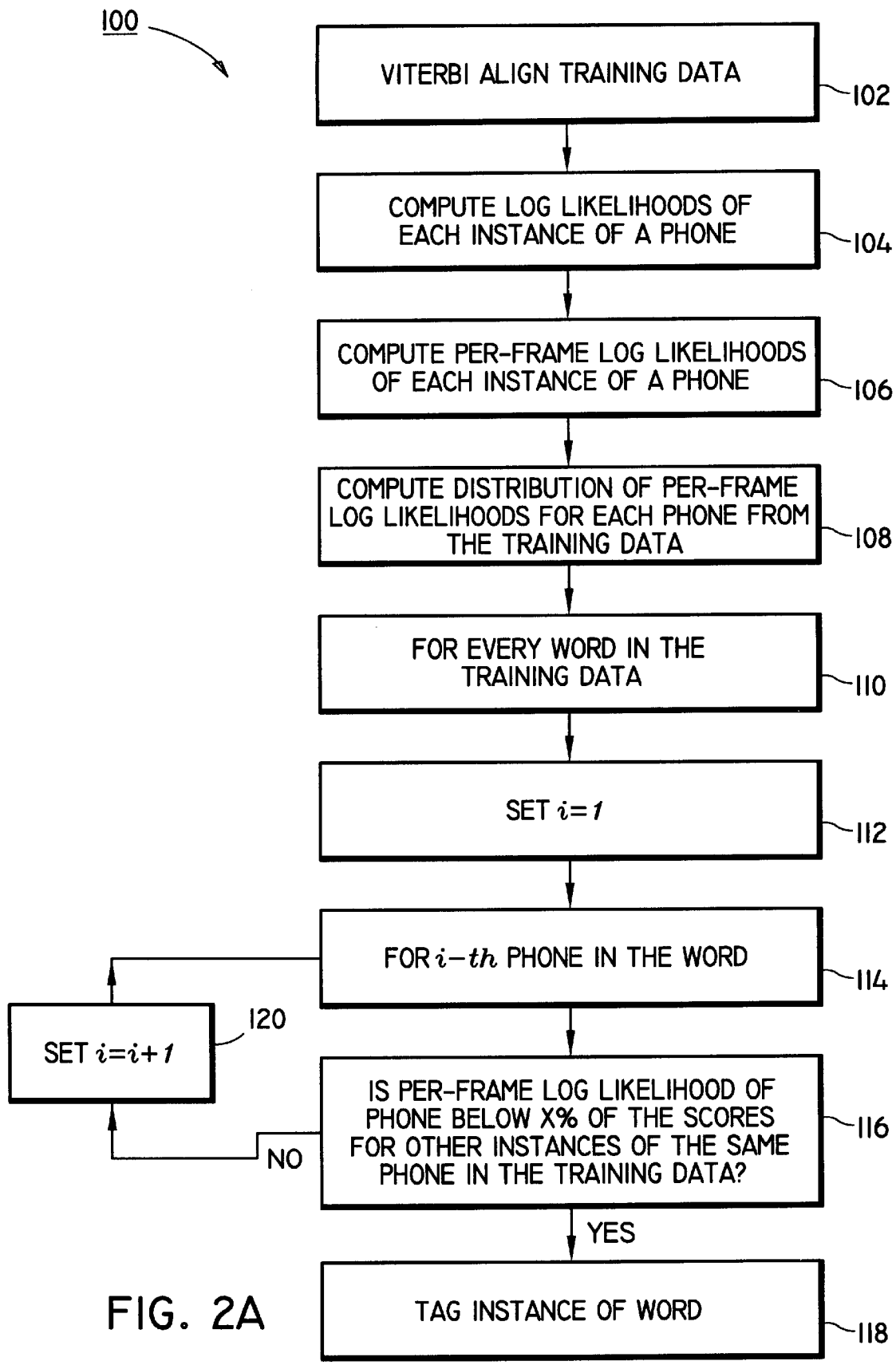
FIGS. 2A and 2B are flow charts illustrating one embodiment of a method of identifying and correcting mismatches between acoustic data and transcriptions according to the invention.

A detailed description of a preferred method of identifying and correcting mismatches between acoustic training data and an associated transcription, as performed by the mismatch identification facility 20, will now be given in the context of FIGS. 2A and 2B.

As previously mentioned, the transcription corresponding to the acoustic data is typically expressed in terms of basic or fundamental units (i.e., classes) such as, for example, phones, syllables, words, or phrases. As is known, the transcription of the training data is used to form the initial models that comprise the acoustic model 18A. Accordingly, such initial models are constructed for these fundamental classes. Formation of these initial models is performed by the speech recognition engine 16, as is known. In conventional systems, the acoustic data and transcription are then used to train up the acoustic model (initial models) for subsequent real-time decoding.

For example, assuming you have the words "thank you" in the acoustic data and in the transcription, the process involves finding the parts of the transcription that correspond to the uttered words "thank you" in the acoustic data. Then, you train up the model for the different sub-units of the words "thank you" using the acoustics data you have identified as belonging to those words. The sub-units are typically phones or phones in context.

However, as previously explained, since mispronunciations, inconsistencies and errors exist between the transcription and the acoustic data, the acoustic model trained in the conventional manner is often poorly estimated and corrupted. For example, the acoustic data may include the spoken utterance: "Please give me a call, goodbye," but due to an error in the transcription, the corresponding part of the transcription reads: "Please give me a call, thank you, goodbye." Thus, the words "thank you" are erroneously in the transcription, for whatever reason. A problem arises due to the fact that the initial models are still formed from the transcription including the error and, even though there is no corresponding "thank you" in the acoustic data, some portion of the acoustic data is going to align to the words "thank you." That is, the sub-units or phones for the words "thank" and "you", contain the following phones TH AE NG KD (thank) and Y UW (you). However, because a segment of the acoustic data aligns to these sub-units, which really does not belong to these sub-units, you will have poor estimates for the sounds corresponding to these sub-units.

While the discussion above gives an example of an erroneous transcription as the cause of the corrupted or poorly estimated models, other things can cause these problematic mismatches. For example, a bad baseform for a word can lead to a poor match between acoustic data and transcription. Also, co-articulation (e.g., "going to" in the transcription and "gonna" in the acoustic data) can cause similar problems to arise. Similar problems can occur when the acoustic data contains background noise. That is, the portions of the acoustic data representative of the background noise will find no correspondence in the transcription.

Advantageously, the inventive mismatch identification process identifies and corrects the errors and inconsistencies between the acoustic data and the transcription to provide an improved acoustic model (in the case of training) and more accurate decoding results (in the case of real-time decoding).

Given these initial models, a preferred mismatch identification process 100 proceeds as follows. First, a Viterbi alignment process is performed between the transcription and the acoustic data using the initial models (step 102). That is, the acoustic training data is aligned against the transcription. As is known, the Viterbi alignment process includes segmenting the acoustic data and the transcription and finding the best match between segments of the acoustic data and the transcription. The alignment process is preferably performed by the mismatch processor 22 which reads the data and models from the engine 16 and stores such information in memory 23 for further processing. However, the alignment process may alternatively be performed by the engine 16.

Next, a probability score is computed, via the processor 22, for each instance of a class in the training data. For purposes of this illustrative embodiment, the fundamental unit or class is a phone. Thus, the probability score represents the probability that the particular phone is aligned with the appropriate portion of the transcription. For example, log likelihoods are computed for each instance of a phone (step 104) in the training data. Then, average per-frame log likelihoods of each instance of a phone are computed (step 106) by processor 22. As explained above with respect to the speech pre-processor 12, the input speech signal (e.g., acoustic training data) is sampled and partitioned into time frames for discrete processing. This frame length is used to normalize the log likelihoods and thus generate average per-frame log likelihoods. The duration of a frame is not critical to the invention but may typically be about 10 milliseconds. It is the average per-frame log likelihoods that preferably serve as the probability scores.

Next, a histogram of the probabilistic scores (average per-frame log likelihoods) is generated by the processor 22. That is, a distribution of average per-frame log likelihoods for each phone from the training data is computed (step 108). Then, from the histogram of scores, the instances of a class that correspond to the lowest score in the histogram, based on a predetermined threshold value, are selected by the processor 22. The predetermined threshold value may be previously set in the processor 22 and may be based on the tolerance of the particular application with which the speech recognizer 10 is to be used. That is, if the tolerance for poorly estimated models is relatively high, then the threshold would be set lower (and thereby catch only very low scores) than the same for an application having a higher tolerance.

So, as previously mentioned, for the example above with respect to the words "thank you" being present in the transcription but not the acoustic data, some acoustic data will align to these words. Because the acoustic data does not accurately correspond to those transcription words, the scores for these particular occurrences of phones will be relatively low. For example, the phone "TH" in "thank" will have a low score. However, other occurrences of the phone "TH", which properly match between the acoustic data and the transcription, have relatively higher scores. Therefore, in the histogram or distribution of these scores, there will be a range of scores with the lower scores falling at the bottom of the distribution. Thus, mismatches are identified as words having phones that fall below the predetermined threshold. Alternatively, words with phones having scores within a certain percentage of scores may be identified as including mismatches. For example, words with phones having scores which fall into the lower 1% of scores for a given phone are identified as mismatched.

Referring again to FIG. 2A, an example of these identification steps is shown. After obtaining all the average per-frame log likelihoods and the histograms for each phone, the processor 22 takes each word in the acoustic training data (step 110) which has a sequence of phones (baseform) associated therewith and establishes a counter I, where I represents the number of phones in any word. The counter I is set equal to 1, i.e., first phone of word (step 112). Now, for each phone (I-th phone) in the word (block 114), find whether the per-frame log likelihood of the phone is below x % (e.g., x equals 1) of the scores for other instances of the same phone in the training data (step 116). If yes, then tag the instance of the phone and preferably the word containing that phone (step 118). If no, set the counter to I+1, and ask the same question. This is repeated for every phone and, thus, every word in the training data until all tagged words are identified. These are the words that are mismatched as between the acoustic data and the transcription. As mentioned, words may be tagged for many different reasons, for example, due to an incorrect baseform, transcription error, noisy speech input background, or co-articulation effects.

Figure 2B:
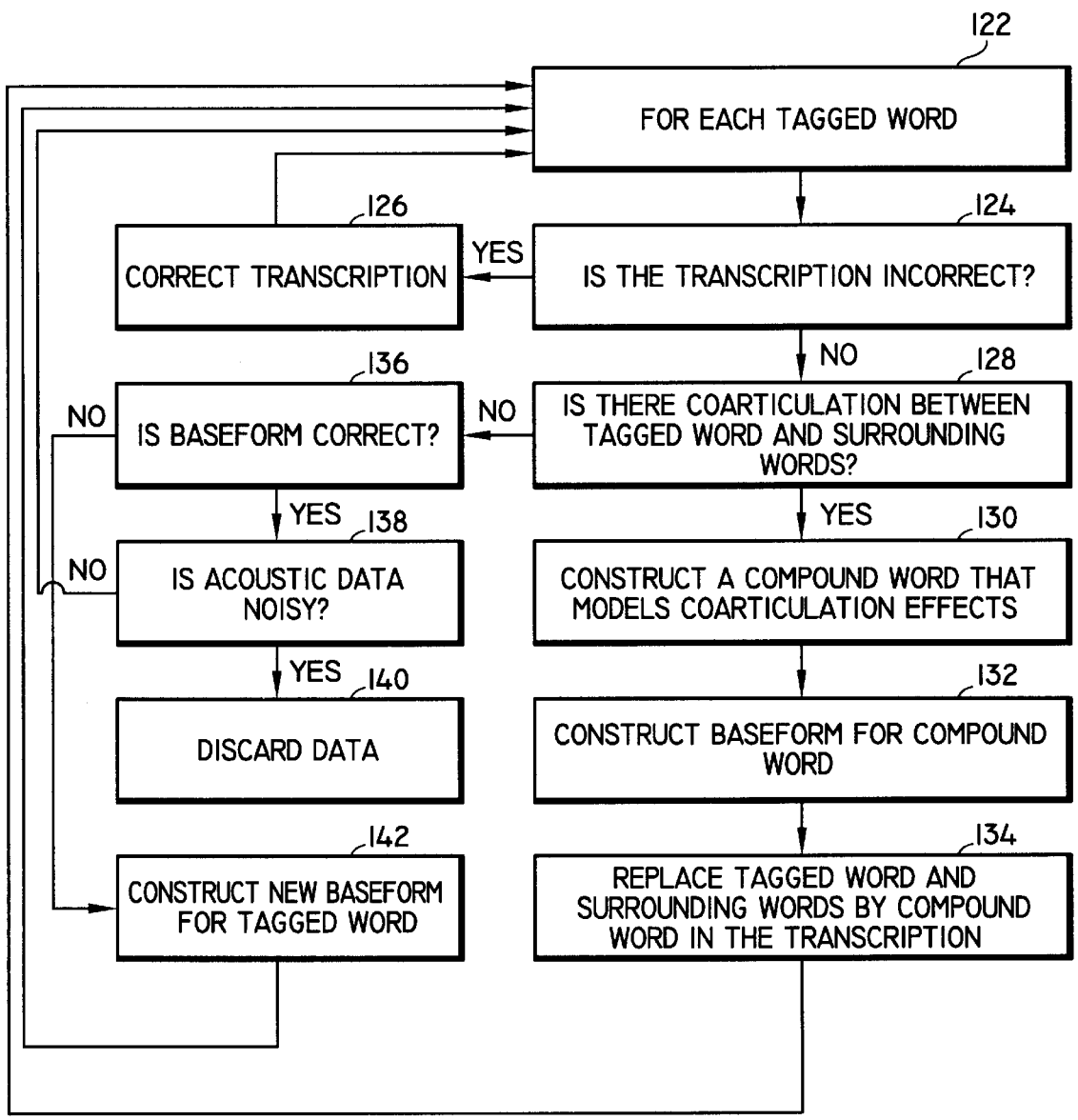

Referring now to FIG. 2B, a preferred method for correcting the mismatches tagged by the processor 22 is shown. It is to be appreciated that the steps of correcting the tagged mismatches may be performed automatically, in part, by the processor 22 and manually, in part, by a human operator. Accordingly, the following description of the correction process will be explained in terms of a preferred combination of automatic and manual correction; however, one of ordinary skill in the art will realize that certain steps may be alternatively performed.

Thus, for the first tagged word (block 122), it is determined whether the transcription is incorrect (step 124). That is, a human operator may view the portion of the transcription containing each tagged word on a visual display (output device) 26 and, at the same time, instruct the processor 22 to que the appropriate portion of the acoustic data, stored on the recorder 27, corresponding to the tagged portion of the transcription. The user then listens to that portion of the acoustic utterance, via the speaker device 28, and determines whether the tagged portion of the transcription is incorrect as compared to the utterance. If incorrect, he can correct the transcription (step 126), via a keyboard (input device) 24, to make the transcription consistent with the acoustic training data. The portion of the message may then be trained up again with the corrected transcription.

If the transcription is correct, it is determined whether there is co-articulation between the tagged word and the surrounding words (step 128). This may be done by the human operator (using the display and recorder, as explained above) or the processor 22. If there is co-articulation detected, a compound word which models the co-articulated effect is formed (step 130), e.g., the words "going to" in the transcription correspond to the co-articulated compound word "gonna," as spoken during training. Then, a baseform is constructed for the compound word (step 132). Finally, the tagged word and, if necessary, the surrounding words are replaced in the transcription (step 134). The data can then be trained up again with the compound word.

If no co-articulation is detected, it is determined whether the baseform of the tagged word is correct (step 136). Again, this may be determined by the operator (on the display) or the processor 22. If the baseform is correct, it is determined whether there is any background noise at that portion of the acoustic data (step 138). If yes, the data is discarded or re-uttered without the background noise. However, if the baseform is not correct, then a new baseform is constructed for the tagged word (step 142). The above corrective steps are then repeated for a each tagged word.

Accordingly, the apparatus and methods of the present invention advantageously identify and correct mismatches between acoustic data (both real-time and training data) and the corresponding transcription, thereby substantially eliminating poorly estimated and corrupted acoustic models otherwise caused by such mismatches. Thus, the performance of an associated speech recognition system is substantially improved.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of identifying mismatches between acoustic data and a corresponding transcription, the transcription being expressed in terms of basic units, the method comprising the steps of:

(a) aligning the acoustic data with the corresponding transcription;

(b) computing a probability score for each instance of a basic unit in the acoustic data based upon an alignment of the acoustic data with the corresponding transcription;

(c) generating a distribution function on the probability score for the each instance of a basic unit;

(d) tagging, as mismatches, instances of a basic unit corresponding to a particular range of scores in the distribution for each basic unit based on a threshold value; and (e) correcting the mismatches, wherein the acoustic data corresponds to training data provided during a training phase of a speech recognition system or to recognition data provided during a recognition phase of the speech recognition system, but not to adaptation data.

2. The method of claim 1, wherein the step of aligning the acoustic data with the corresponding transcription includes performing a Viterbi alignment.

3. The method of claim 1, wherein the step of computing a probability score includes:
   (a) computing log likelihoods of each instance of a basic unit; and
   (b) normalizing the log likelihoods.

4. The method of claim 3, wherein the step of normalizing the log likelihoods includes computing average per-frame log likelihoods of each instance of a basic unit.

5. The method of claim 1, wherein the step of generating a distribution function includes forming a histogram of probability scores for each basic unit of the acoustic data.

6. The method of claim 1, wherein the tagging step includes:
   (a) for each basic unit, determining whether the probability score of the basic unit is below the threshold value as compared to other instances of the same basic unit in the acoustic data; and
   (b) if so, tagging the basic unit as a mismatch.

7. The method of claim 1, wherein the threshold value is a percentage.

8. The method of claim 1, further including the step of tagging a word containing an instance of a basic unit corresponding to a lowest score in the distribution for each basic phonetic unit.

9. The method of claim 8, wherein, for each tagged word, the correcting step includes:
   (a) determining whether the transcription pertaining to the word is correct; and
   (b)) if the word is incorrect, correcting the word in the transcription to correspond to the acoustic data.

10. The method of claim 8, wherein, for each tagged word, the correcting step includes determining if there is a co-articulation between the tagged word and surrounding words in the transcription.

11. The method of claim 10, wherein, if a co-articulation is detected, the correcting step includes:
   (a) constructing a compound word which models the co-articulated words;
   (b) constructing a baseform for the compound word; and
   (c) replacing at least the tagged word with the compound word in the transcription.

12. The method of claim 8, wherein, for each tagged word, the correcting step includes:
   (a) determining whether a baseform associated with the tagged word is correct; and
   (b) if not, correcting the baseform.

13. The method of claim 8, wherein, for each tagged word, the correcting step includes determining whether a portion of the acoustic data corresponding to the tagged word includes noise.

14. The method of claim 13, wherein, if noise is included in the portion of the acoustic data corresponding to the tagged word, discarding the portion of the acoustic data.

15. Computer-based apparatus for identifying mismatches between acoustic data and a corresponding transcription associated with a speech recognition engine, the transcription being expressed in terms of basic units, the apparatus comprising:
   a processor, operatively coupled to the speech recognition engine, for:
   (a) aligning the acoustic data with the corresponding transcription;
   (b) computing a probability score for each instance of a basic unit in the acoustic data based upon an alignment of the acoustic data with the corresponding transcription;
   (c) generating a distribution function on the probability score for the each instance of a basic unit;
   (d) tagging, as mismatches, instances of a basic unit corresponding to a particular range of scores in the distribution for each basic unit based on a threshold value; and
   (e) correcting the mismatches, wherein the acoustic data corresponds to training data provided during a training phase of the speech recognition engine or to recognition data provided during a recognition phase of the speech recognition engine, but not to adaptation data.

16. The apparatus of claim 15, further comprising an input device for permitting a user to correct at least a portion of the tagged mismatches.

17. The apparatus of claim 15, further comprising an output device permitting a user to correct at least a portion of the tagged mismatches.

18. The apparatus of claim 15, further comprising an acoustic data playback device for permitting a user to correct at least a portion of the tagged mismatches.

19. Computer-based apparatus for identifying mismatches between acoustic data and a corresponding transcription associated with a speech recognition engine, the transcription being expressed in terms of basic units, the apparatus comprising:
   (a) means for aligning the acoustic data with the corresponding transcription;
   (b) means for computing a probability score for each instance of a basic unit in the acoustic data based upon an alignment of the acoustic data with the corresponding transcription;
   (c) means for generating a distribution function on the probability score for the each instance of a basic unit;
   (d) means for tagging, as mismatches, instances of a basic unit corresponding to a particular range of scores in the distribution for each basic unit based on a threshold value; and
   (e) means for correcting the mismatches, wherein the acoustic data corresponds to training data provided during a training phase of a speech recognition system or to recognition data provided during a recognition phase of the speech recognition system, but not to adaptation data.

* * * * *